United States Patent
Pereira

(10) Patent No.: US 9,171,154 B2
(45) Date of Patent: Oct. 27, 2015

(54) SYSTEMS AND METHODS FOR SCANNING PACKED PROGRAMS IN RESPONSE TO DETECTING SUSPICIOUS BEHAVIORS

(71) Applicant: Symantec Corporation, Mountain View, CA (US)

(72) Inventor: Shane Pereira, Newbury Park, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/178,727

(22) Filed: Feb. 12, 2014

(65) Prior Publication Data

US 2015/0227742 A1    Aug. 13, 2015

(51) Int. Cl.
*G06F 21/56*    (2013.01)
*G06F 21/52*    (2013.01)

(52) U.S. Cl.
CPC ............... *G06F 21/56* (2013.01); *G06F 21/52* (2013.01)

(58) Field of Classification Search
CPC ................................. G06F 21/52; G06F 21/56
See application file for complete search history.

(56) References Cited

U.S. PATENT DOCUMENTS

| 6,073,239 | A  | * | 6/2000  | Dotan         | 726/24 |
|-----------|----|---|---------|---------------|--------|
| 7,779,472 | B1 |   | 8/2010  | Lou           |        |
| 8,281,399 | B1 | * | 10/2012 | Chen et al.   | 726/24 |
| 8,479,291 | B1 |   | 7/2013  | Bodke         |        |
| 2008/0040710 | A1 |   | 2/2008  | Chiriac    |        |
| 2011/0083186 | A1 | * | 4/2011  | Niemela et al. | 726/24 |
| 2012/0266244 | A1 | * | 10/2012 | Green et al. | 726/24 |
| 2014/0041034 | A1 | * | 2/2014  | Li et al.   | 726/24 |
| 2014/0283058 | A1 | * | 9/2014  | Gupta       | 726/23 |
| 2014/0325650 | A1 | * | 10/2014 | Pavlyushchik | 726/23 |

OTHER PUBLICATIONS

Royal et al., "PolyUnpack: Automating the Hidden-Code Extraction of Unpack-Executing Malware", 2006, 10 pages.*
"Eraser", http://eraser.heidi.ie/, as accessed Dec. 11, 2013, (Dec. 3, 2008).
Patrick Gardner; Systems and Methods for Blocking and Removing Internet-Traversing Malware; U.S. Appl. No. 12/683,168, filed Jan. 6, 2010.
Adam Glick, et al; Systems and Methods for User-Directed Malware Remediation; U.S. Appl. No. 13/419,360, filed Mar. 13, 2012.
Yi Li, et al; Systems and Methods for Detecting Malware Variants; U.S. Appl. No. 13/297,244, filed Nov. 15, 2011.

(Continued)

*Primary Examiner* — Taghi Arani
*Assistant Examiner* — Thaddeus Plecha
(74) *Attorney, Agent, or Firm* — ALG Intellectual Property, LLC

(57)    ABSTRACT

A computer-implemented method for scanning packed programs in response to detecting suspicious behaviors may include (1) executing a packed program that may include (i) malicious code that has been obfuscated within the packed program and (ii) unpacking code that deobfuscates and executes the malicious code when the packed program is executed, (2) monitoring, while the packed program is executing, how the packed program behaves, (3) detecting, while monitoring how the packed program behaves, a suspicious behavior of the malicious code that indicates that the unpacking code has deobfuscated and executed the malicious code, and (4) performing a security operation on the packed program in response to detecting the suspicious behavior of the malicious code. Various other methods, systems, and computer-readable media are also disclosed.

18 Claims, 6 Drawing Sheets

(56) References Cited

OTHER PUBLICATIONS

Kevin Roundy, et al; Systems and Methods for Using Event-Correlation Graphs to Detect Attacks on Computing Systems; U.S. Appl. No. 14/041,762, filed Sep. 30, 2013.
Fanglu Guo, et al; Systems and Methods for Reducing False Positives When Using Event-Correlation Graphs to Detect Attacks on Computing Systems; U.S. Appl. No. 14/031,044, filed Sep. 19, 2013.
Ke Fang, et al; Systems and Methods for Providing Security for Synchronized Files; U.S. Appl. No. 14/139,035, filed Dec. 23, 2013.
Martignoni, Lorenzo et al., "OmniUnpack: Fast, Generic, and Safe Unpacking of Malware", http://citeseerx.ist.psu.edu/viewdoc/download;jsessionid=CFEBE9AD004A80BB40B83B9E7DF5BF28?doi=10.1.1.124.2886&rep=rep1&type=pdf, as accessed Dec. 11, 2013, Computer Security Applications Conference, 2007. ACSAC 2007. Twenty-Third Annual. Miami Beach, FL, (Dec. 10-14, 2007), 431-441.
Sandeep Bhatkar; Systems and Methods for Distinguishing Code of a Program Obfuscated Within a Packed Program; U.S. Appl. No. 14/135,004, filed Dec. 19, 2013.
Acar Tamersoy, et al; Systems and Methods for Adjusting Suspiciousness Scores in Event-Correlation Graphs; U.S. Appl. No. 14/138,891, filed Dec. 23, 2013.
Kevin Roundy, et al; Systems and Methods for Detecting Malware-Induced Crashes; U.S. Appl. No. 14/138,130, filed Dec. 23, 2013.

\* cited by examiner

SYSTEMS AND METHODS FOR SCANNING PACKED PROGRAMS IN RESPONSE TO DETECTING SUSPICIOUS BEHAVIORS

BACKGROUND

Because many existing antivirus technologies detect malicious programs ("malware") by detecting or identifying unique digital signatures associated with known-malicious programs, malware authors have attempted to proliferate malware by generating thousands or potentially millions of unique variations of the same malicious program. Often, malware authors create a unique variation of a malicious program by packing (e.g., compressing, encrypting, and/or otherwise obfuscating) the malicious program within a new program (referred to as a "packed program"). When the packed program is executed, additional code within the packed program may unpack (e.g., decompress and/or decrypt) and then execute the obfuscated malicious program.

Unfortunately, this packing process may enable a malicious program to evade detection by existing antivirus technologies since existing antivirus technologies may be unable to identify packed programs within which the malicious program has been obfuscated until security system vendors update their signature databases to include digital signatures for each unique packed program. Accordingly, the instant disclosure identifies a need for additional and improved systems and methods for detecting malicious programs obfuscated within packed programs.

SUMMARY

As will be described in greater detail below, the instant disclosure generally relates to systems and methods for scanning packed programs in response to detecting suspicious behaviors. In one example, a computer-implemented method for performing such a task may include (1) executing a packed program that includes (i) malicious code that has been obfuscated within the packed program and (ii) unpacking code that deobfuscates and executes the malicious code when the packed program is executed, (2) monitoring, while the packed program is executing, how the packed program behaves, (3) detecting, while monitoring how the packed program behaves, a suspicious behavior of the malicious code that indicates that the unpacking code has deobfuscated and executed the malicious code, and (4) performing a security operation on the packed program in response to detecting the suspicious behavior of the malicious code.

In some embodiments, the step of performing the security operation on the packed program may include scanning, while the packed program is executing, at least a portion of memory of the packed program for at least one malware signature. In addition, the computer-implemented method for scanning packed programs in response to detecting suspicious behaviors may further include receiving scanning criteria that specifies at least one suspicious behavior that will trigger scanning of memory of the packed program for at least one malware signature.

In one example, the step of monitoring how the packed program behaves may include monitoring how the packed program behaves for the specified suspicious behavior, the step of detecting the suspicious behavior may include detecting the specified suspicious behavior, and the step of performing the security operation on the packed program may include scanning, in response to detecting the specified suspicious behavior, the memory of the packed program for the malware signature.

In some examples, the scanning criteria may further specify a portion of the memory of the packed program that should be scanned in response to detecting the specified suspicious behavior, and the step of scanning the memory of the packed program for the malware signature may include scanning the specified portion of the memory of the packed program for the malware signature.

In some embodiments, the scanning criteria may further specify at least one malware signature with which to scan the memory of the packed program in response to detecting the specified suspicious behavior, and the step of scanning the memory of the packed program for the malware signature may include scanning the memory of the packed program for the specified malware signature.

In one example, the step of detecting the suspicious behavior of the malicious code may include (1) detecting an attempt, by the malicious code, to create a run registry key, (2) detecting an attempt, by the malicious code, to create a generic load point, (3) detecting an attempt, by the malicious code, to inject the malicious code into another process, and/or (4) detecting an attempt, by the malicious code, to modify security settings.

A system for implementing the above-described method may include (1) an executing module, stored in memory, that executes a packed program that may include (i) malicious code that has been obfuscated within the packed program and (ii) unpacking code that deobfuscates and executes the malicious code when the packed program is executed, (2) a monitoring module, stored in memory, that monitors how the packed program behaves while the packed program is executing, (3) a detecting module, stored in memory, that detects, while the packed program is monitored, a suspicious behavior of the malicious code that indicates that the unpacking code has deobfuscated and executed the malicious code, (4) a security module, stored in memory, that performs a security operation on the packed program in response to detecting the suspicious behavior of the malicious code, and (5) at least one processor that executes the executing module, the monitoring module, the detecting module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) execute a packed program that may include (i) malicious code that has been obfuscated within the packed program and (ii) unpacking code that deobfuscates and executes the malicious code when the packed program is executed, (2) monitor, while the packed program is executing, how the packed program behaves, (3) detect, while monitoring how the packed program behaves, a suspicious behavior of the malicious code that indicates that the unpacking code has deobfuscated and executed the malicious code, and (4) perform a security operation on the packed program in response to detecting the suspicious behavior of the malicious code.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Figure 1:
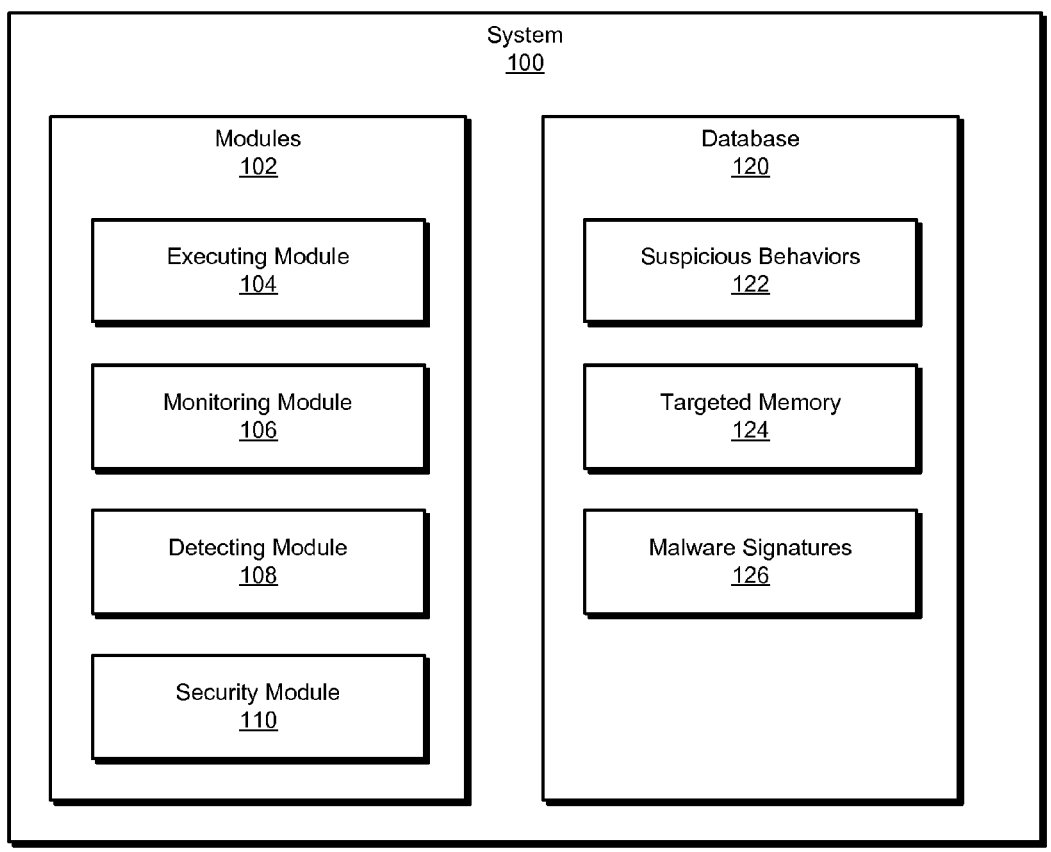
FIG. 1 is a block diagram of an exemplary system for scanning packed programs in response to detecting suspicious behaviors.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for scanning packed programs in response to detecting suspicious behaviors. As will be explained in greater detail below, by monitoring an executing packed program for suspicious behaviors, the systems and methods described herein may enable a program obfuscated within the packed program to be unpacked and scanned for malware. Furthermore, in some examples, by enabling obfuscated programs contained within packed programs to be unpacked and scanned for malware, these systems and methods may reduce the number of malware signatures that must be created and used to detect malware variants. For example, the systems and methods described herein may detect a packed program that includes an obfuscated malicious program by scanning the packed program using a digital signature of the malicious program instead of a digital signature of the packed program. Embodiments of the instant disclosure may also provide various other advantages and features, as discussed in greater detail below.

Figure 2:
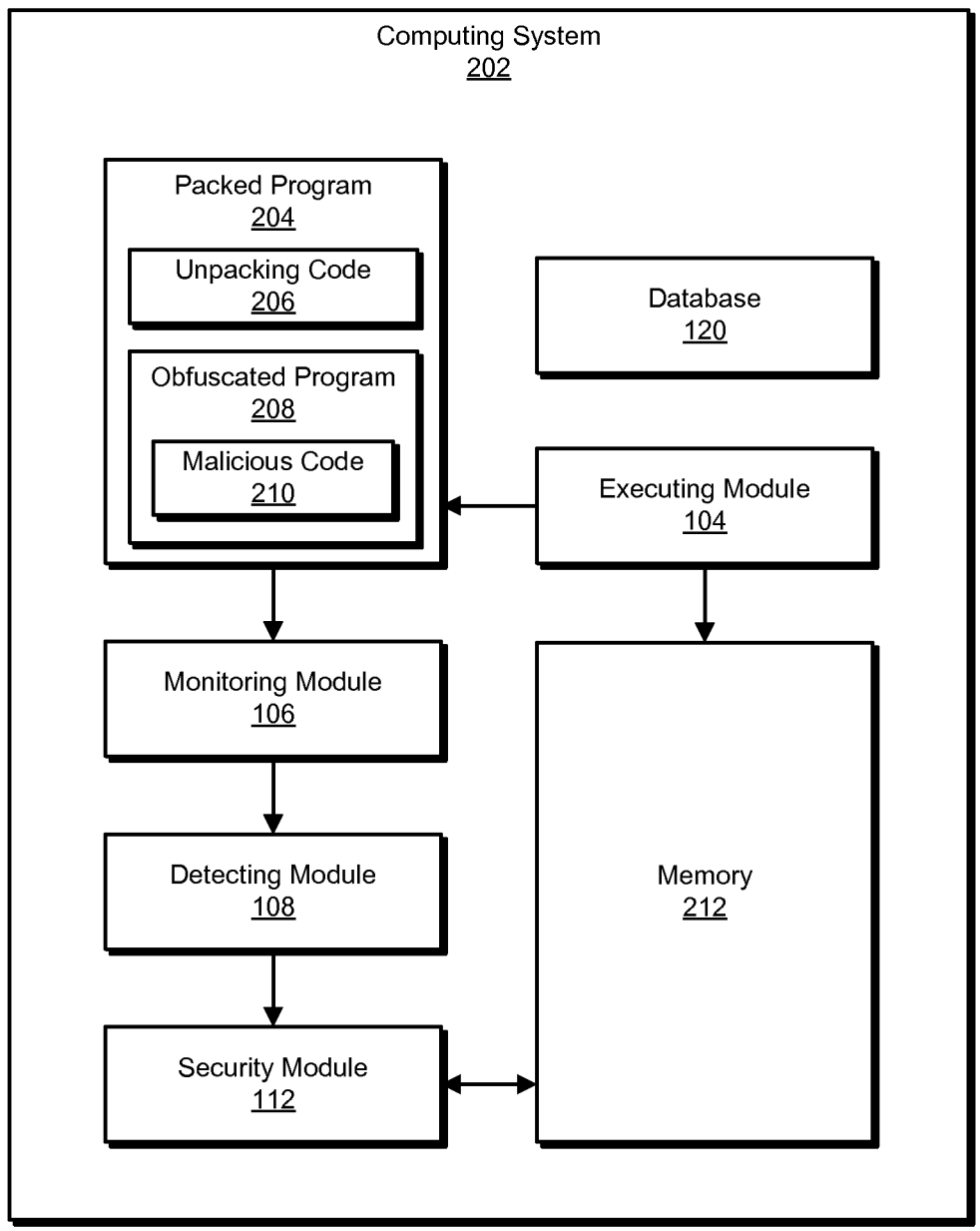
FIG. 2 is a block diagram of an additional exemplary system for scanning packed programs in response to detecting suspicious behaviors.

The following will provide, with reference to FIGS. 1-2, detailed descriptions of exemplary systems for scanning packed programs in response to detecting suspicious behaviors. Detailed descriptions of corresponding computer-implemented methods will also be provided in connection with FIGS. 3 and 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for scanning packed programs in response to detecting suspicious behaviors. As illustrated in this figure, exemplary system 100 may include one or more modules 102 for performing one or more tasks. For example, and as will be explained in greater detail below, exemplary system 100 may include an executing module 104 that executes a packed program that may include (i) malicious code that has been obfuscated within the packed program and (ii) unpacking code that deobfuscates and executes the malicious code when the packed program is executed. Exemplary system 100 may also include a monitoring module 106 that monitors, while the packed program is executing, how the packed program behaves.

In addition, and as will be described in greater detail below, exemplary system 100 may include a detecting module 108 that detects a suspicious behavior of the malicious code that indicates that the unpacking code has deobfuscated and executed the malicious code. Exemplary system 100 may also include a security module 110 that performs a security operation on the packed program in response to detecting the suspicious behavior of the malicious code. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as computing system 202 in FIG. 2, computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may store information about one or more suspicious behaviors (e.g., suspicious behaviors 122) that may trigger the systems described herein to perform security actions (e.g., malware scans) on packed programs, information about memory targeted for scanning (e.g., targeted memory 124), and/or information about one or more malware signatures (e.g., malware signatures 126) that may be used to scan packed programs for malware.

Database 120 may represent portions of a single database or computing device or a plurality of databases or computing devices. For example, database 120 may represent a portion of computing system 202 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as computing system 202 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary computing system 202 in FIG. 2. In one embodiment, one or more of modules 102 from FIG. 1 may, when executed by at least one processor of computing system 202, enable computing system 202 to scan packed programs for malware in response to detecting suspicious behaviors. For example, and as will be described in greater detail below, one or more of modules 102 may cause computing system 202 to (1) execute a packed program 204 that includes (i) malicious code 210 that has been obfuscated within packed program 204 and (ii) unpacking code 206 that deobfuscates and executes obfuscated program 208 and/or malicious code 210 when packed program 204 is executed, (2) monitor, while packed program 204 is executing, how packed program 204 behaves, (3) detect, while monitoring how packed program 204 behaves, a suspicious behavior of malicious code 210 that indicates that unpacking code 206 has deobfuscated and executed malicious code 210, and (4) perform a security operation on packed program 204 (e.g., by scanning memory 212 of packed program 204 for at least one malware signature) in response to detecting the suspicious behavior of malicious code 210.

Computing system 202 generally represents any type or form of computing system capable of reading computer-executable instructions. Examples of computing system 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing system.

Figure 3:
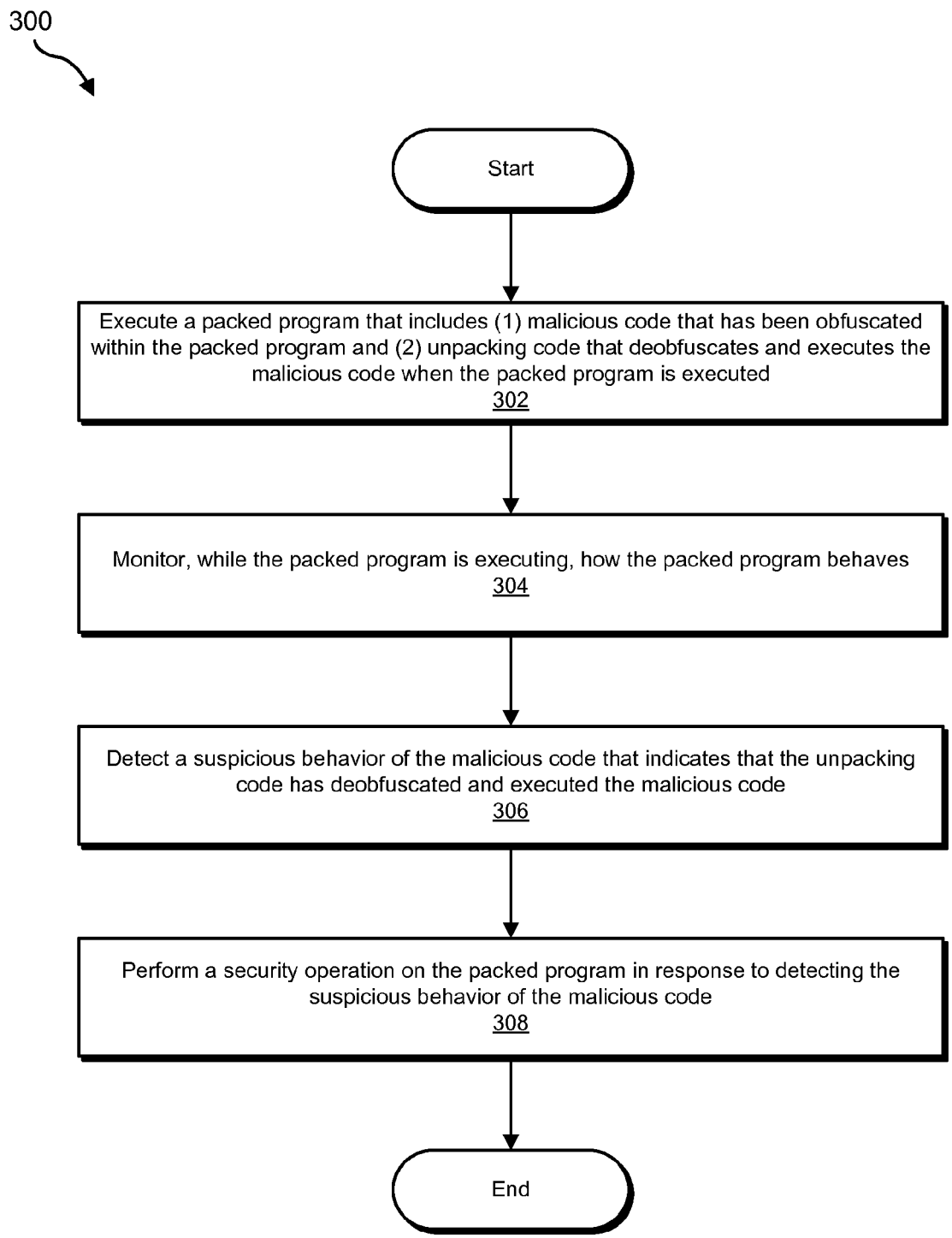
FIG. 3 is a flow diagram of an exemplary method for scanning packed programs in response to detecting suspicious behaviors.

FIG. 3 is a flow diagram of an exemplary computer-implemented method 300 for scanning packed programs in response to detecting suspicious behaviors. The steps shown in FIG. 3 may be performed by any suitable computer-executable code and/or computing system. In some embodiments, the steps shown in FIG. 3 may be performed by one or more of the components of system 100 in FIG. 1, computing system 202 in FIG. 2, computing system 510 in FIG. 5, and/or portions of exemplary network architecture 600 in FIG. 6.

As illustrated in FIG. 3, at step 302 one or more of the systems described herein may execute a packed program that includes (1) malicious code that has been obfuscated within the packed program and (2) unpacking code that deobfuscates and executes the malicious code when the packed program is executed. For example, executing module 104 may, as part of computing system 202 in FIG. 2, execute packed program 204 that includes malicious code 210 that has been obfuscated within packed program 204 and unpacking code 206 that deobfuscates and executes malicious code 210 when packed program 204 is executed.

As used herein, the phrase "program" generally refers to any file that includes code (i.e., instructions) that may be executed by a computing device (e.g., an executable or a binary). A program may be formatted according to any suitable executable file format. For example, a program may be formatted according to a Portable Executable (PE) file format. The phrase "program" may also refer to any program capable of being executed by a WINDOWS operating system, a LINUX operating system, a MAC operating system, a UNIX operating system, and/or any other operating system.

Figure 4:
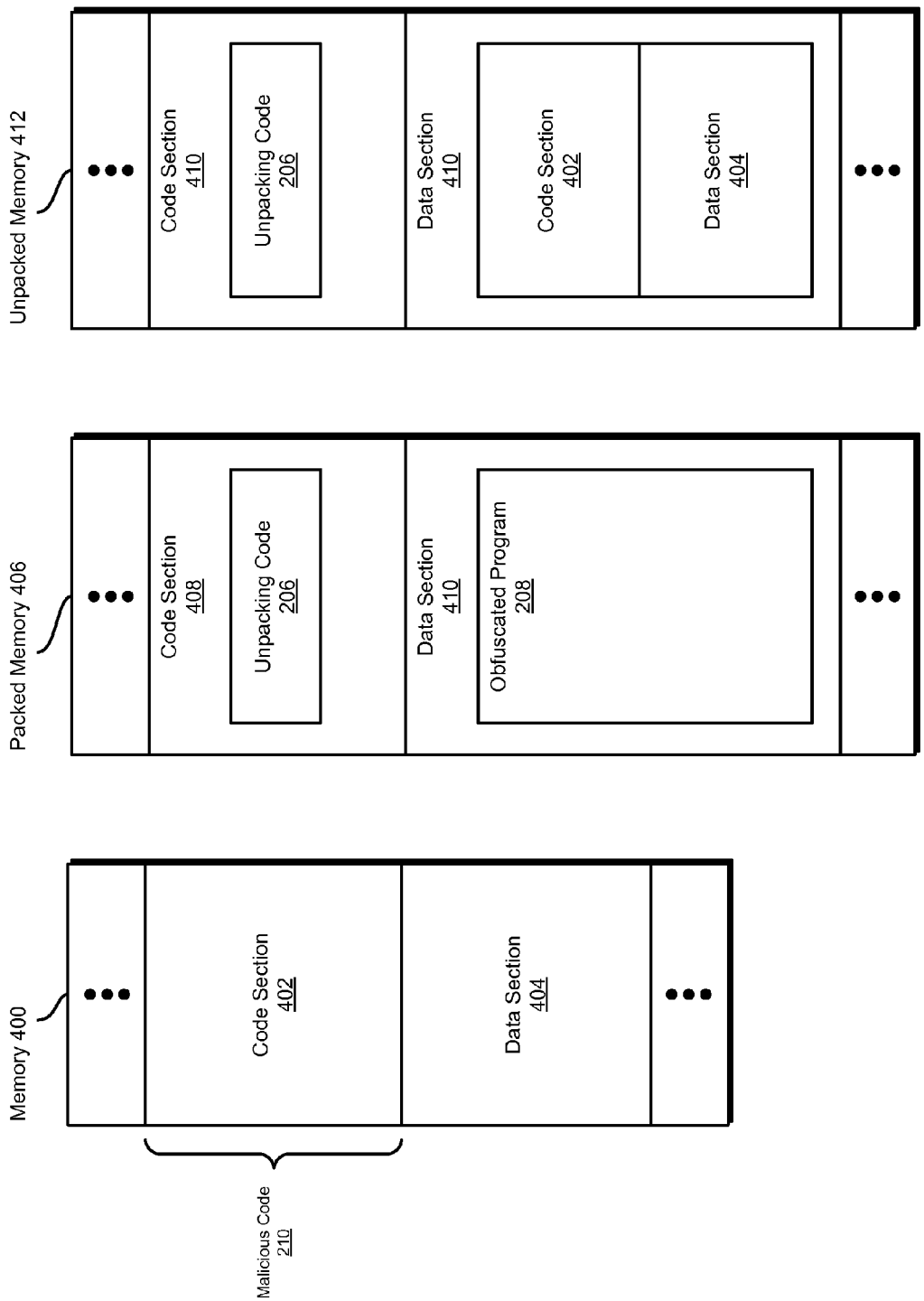
FIG. 4 is a block diagram of exemplary memory of various programs.

In some examples, a program may include a code section and a data section that are loaded into memory when the program is executed. Memory 400 in FIG. 4 illustrates an exemplary runtime memory state of an exemplary program that has not been obfuscated within a packed program. As shown, the runtime memory state of an exemplary program that has not been obfuscated within a packed program may include the program's code section (e.g., code section 402) and the program's data section (e.g., data section 404). In the examples used herein, memory 400 may represent at least a portion of the memory of obfuscated program 208.

In some instances, a program may be packed (e.g., compressed, encrypted, and/or otherwise obfuscated) within another program (referred to as a "packed program"). For example, packed program 204 in FIG. 2 may represent a packed program within which obfuscated program 208 has been packed. In some examples, a program may be packed one or more times (e.g., a packed program within which a program has been packed may also be packed within another packed program).

In some examples, the phrase "packed program" may refer to any program created by a packer. The term "packer," as used herein, generally refers to any type or form of tool used to obfuscate programs. Examples of packers that may be used to obfuscate programs include, without limitation, compressors (e.g., ULTIMATE PACKER FOR EXECUTABLES (UPX), ASPACK, and UPACK) that compress files, crypters (e.g., POLYCRYPT PE) that encrypt files, protectors (e.g., ARMADILLO and THEMIDA) that both compress and encrypt files, bundlers (such as PEBUNDLE and MOLEBOX) that bundle multiple executable and data files into a single bundled executable file, and the like.

In some examples, a packed program may include a code section and a data section that are loaded into memory when the packed program is executed. In some examples, the obfuscated program packed within a packed program may be stored within the packed program's data section. Packed memory 406 in FIG. 4 illustrates an exemplary runtime memory state of a packed program when the packed program is first loaded into memory and before any unpacking code of the packed program is executed. In this state, as shown in FIG. 4, the memory of the packed program may include the packed program's code section (e.g., code section 408) and the packed program's data section (e.g., data section 410) that may include a program (e.g., obfuscated program 208) in an obfuscated state.

At runtime, the code of a packed program (e.g., unpacking code) may unpack (e.g., decompress, decrypt, and/or otherwise deobfuscate) the program obfuscated within the packed program. The unpacking code of a packed program may unpack an obfuscated program such that the obfuscated program exist within the memory of the packed program in an unobfuscated and executable state. Unpacked memory 412 in FIG. 4 illustrates an exemplary runtime memory state of a packed program after the unpacking code of the packed program has unpacked the program obfuscated within the packed program. In this state, as shown in FIG. 4, the memory of the packed program may include the obfuscated program's code section (e.g., code section 402) in an unobfuscated state and the obfuscated program's data section (e.g., data section 404) in an unobfuscated state. In the examples used herein, packed memory 406 and unpacked memory 412 may represent runtime states of memory 212.

Returning to FIG. 3, the systems described herein may perform step 302 in any suitable manner. In one example, executing module 104 may execute a packed program by allowing the packed program to be executed. For example, executing module 104 may allow a user to execute the packed program. Additionally or alternatively, executing module 104 may execute a packed program as part of performing a malware scan on the packed program.

At step 304, one or more of the systems described herein may monitor, while the packed program is executing, how the packed program behaves. For example, monitoring module 106 may, as part of computing system 202 in FIG. 2, monitor how packed program 204 behaves while packed program 204 is executing.

The systems described herein may perform step 304 in any suitable manner. In one example, monitoring module 106 may monitor how an executing packed program behaves by monitoring the processes that make up the executing packed program. As used herein, the term "process" may refer to any program in execution (e.g., an instantiation and/or running copy of a program expressed by an executable file). In some examples, a process may include multiple processes, threads, and/or subprocesses.

In general, monitoring module 106 may monitor how an executing packed program behaves for certain suspicious behaviors that may indicate that the unpacking code of the packed program has deobfuscated and executed at least a portion of the malicious code obfuscated within the packed program. For example, monitoring module 106 may monitor how packed program 204 behaves for any or all of the suspicious behaviors contained within suspicious behaviors 122 that may indicate that unpacking code 206 has deobfuscated and executed at least a portion of obfuscated program 208 (e.g., malicious code 210).

The phrase "suspicious behavior," as used herein, generally refers to any occurrence of one or more actions that are performed by a program that may indicate that the program is a packed program and/or that the unpacking code of the packed program has deobfuscated and executed at least a portion of the malicious code obfuscated within the packed program. In at least one example, the phrase "suspicious behavior" may refer to any specific, substantial, and/or complex behavior that indicates that the unpacking code of a packed program has deobfuscated and executed at least a portion of the malicious code obfuscated within the packed program.

In certain examples, the systems and methods described herein may identify suspicious behaviors by analyzing of the behaviors of known malicious and/or known benign programs. In some examples, the phrase "suspicious behavior" may represent one or more actions that are known to be performed by at least one known malicious program when the known malicious program is first executed and/or one or more action that are known to not be performed by a significant number of known benign programs when the known benign programs are first executed.

Examples of suspicious behaviors may include, without limitation, the creation of a run registry key (e.g., a RUN and RUNONCE registry key), the creation of a generic load point (e.g., a configuration and/or program responsible for initiating a packed program or malicious code, such as a Browser Helper Object (BHO)), the injection of malicious code into another process (e.g., a process injection), and/or the modification of security settings. Additional examples of suspicious behaviors may include, without limitation, file creations, file downloads, network communications, and/or process creations. As used herein, the phrase "process injection" may refer to any method for one process to introduce executable instructions into another process to execute. Examples of process injection may include injecting a dynamic-link library into a running process and hooking a function call within another process.

Returning to step 304 in FIG. 3, in some examples, the systems and methods described herein may utilize scanning criteria that specifies suspicious behaviors that will trigger scanning of a packed program's memory for at least one malware signature, and monitoring module 106 may monitor how a packed program behaves for the suspicious behaviors included within the scanning criteria. In at least one example, suspicious behaviors 122 in FIG. 1 may represent a portion the scanning criteria utilized by the systems and methods described herein.

At step 306, one or more of the systems described herein may detect a suspicious behavior of the malicious code that indicates that the unpacking code has deobfuscated and executed the malicious code. For example, detecting module 108 may, as part of computing system 202 in FIG. 2, detect a suspicious behavior of malicious code 210 that indicates that unpacking code 206 has deobfuscated and executed malicious code 210.

The systems described herein may perform step 306 in any suitable manner. For example, detecting module 108 may detect (1) an attempt, by deobfuscated and executing malicious code, to create a run registry key, (2) an attempt, by deobfuscated and executing malicious code, to create a generic load point, (3) an attempt, by deobfuscated and executing malicious code, to inject malicious code into another process, (4) an attempt, by deobfuscated and executing malicious code, to modify security settings, and/or (5) any other suspicious behavior of deobfuscated and executing malicious code.

At step 308, one or more of the systems described herein may perform a security operation on the packed program in response to detecting the suspicious behavior of the malicious code. For example, security module 110 may, as part of computing system 202 in FIG. 2, perform a security operation on packed program 204 in response to detecting the suspicious behavior of malicious code 210.

The systems described herein may perform step 308 in any suitable manner. In one example, security module 110 may perform a security action on a packed program by scanning at least a portion of the packed program's memory for at least one malware signature to determine whether the packed program includes an obfuscated malicious program. For example, security module 110 may perform a security action on packed program 204 by scanning all or a portion of memory 212 (e.g., all or a portion of unpacked memory 412). As used herein, the phrase "memory of a packed program" generally refers to any memory allocated to and/or accessible by a packed program and/or an obfuscated malicious program included within a packed program. In some examples, the memory of a packed program may include, without limitation, the memory image of a packed program and/or any memory dynamically allocated to a packed program.

In some examples, security module 110 may scan the memory of a packed program based at least in part on scanning criteria associated with a detected suspicious behavior. For example, as mentioned above, the systems and methods described herein may utilize scanning criteria that specifies at least one suspicious behavior that will trigger the scanning of a packed program's memory for at least one malware signature, a portion of the packed program's memory that should be scanned in response to detecting the specified suspicious behavior, and/or at least one malware signature with which to scan the packed program's memory in response to detecting the specified suspicious behavior. As such, in some examples, security module 110 may scan, in response to the detection of a suspicious behavior specified by scanning criteria, at least the portion of the memory of the packed program associated with the specified suspicious behavior for at least the malware signatures associated with the specified suspicious behavior.

In at least one example, security module 110 may scan, in response to the detection of a suspicious behavior specified by scanning criteria, only the portion of the memory of the packed program associated with the specified suspicious behavior for only the malware signatures associated with the specified suspicious behavior. By reducing the amount of memory that is scanned for malware signatures and/or the number of malware signatures used to scan for malware, the systems and methods described herein may reduce scanning times and/or scanning loads.

In at least one example, suspicious behaviors 122, targeted memory 124, and malware signatures 126 in FIG. 1 may represent at least a portion of the scanning criteria utilized by the systems and methods described herein.

In addition to or as an alternative to scanning the memory of a packed program, security module 110 may perform additional security actions on the packed program. For example, in response to a positive malware scan, security module 110 may classify the packed program as malicious, terminate execution of the packed program, prevent the packed program from being subsequently executed, quarantine the packed program, delete the packed program, notify a user who is attempting to execute the packed program that the packed program is malicious, and/or perform any other remediation action on the packed program. Additionally or alternatively, security module 110 may update information about known malicious and/or known benign packed programs. For example, security module 110 may generate a malware signature for detecting the packed program without executing the packed program. Upon completion of step 308, exemplary method 300 in FIG. 3 may terminate.

As explained above, by monitoring an executing packed program for suspicious behaviors, the systems and methods described herein may enable a program obfuscated within the packed program to be unpacked and scanned for malware. Furthermore, in some examples, by enabling obfuscated programs contained within packed programs to be unpacked and scanned for malware, these systems and methods may reduce the number of malware signatures that must be created and used to detect malware variants. For example, the systems and methods described herein may detect a packed program that includes an obfuscated malicious program by scanning the packed program using a digital signature of the malicious program instead of a digital signature of the packed program.

In another example, the systems and methods described herein may detect and remediate malicious packed programs by (1) allowing the packed program to be executed, (2) monitoring the executing packed program for suspicious behaviors that may indicate that unpacking code of the packed program has deobfuscated and executed malicious code packed within the packed program, (3) detecting such a suspicious behavior, (4) suspending execution of the packed program, (5) scanning the memory of the packed program for one or more malware signatures, (6) determining that the packed program matches at least one malware signature, and (7) performing a remediation action on the packed program (e.g., quarantining the packed program) in response to determining that the packed program matches at least one malware signature.

Figure 5:
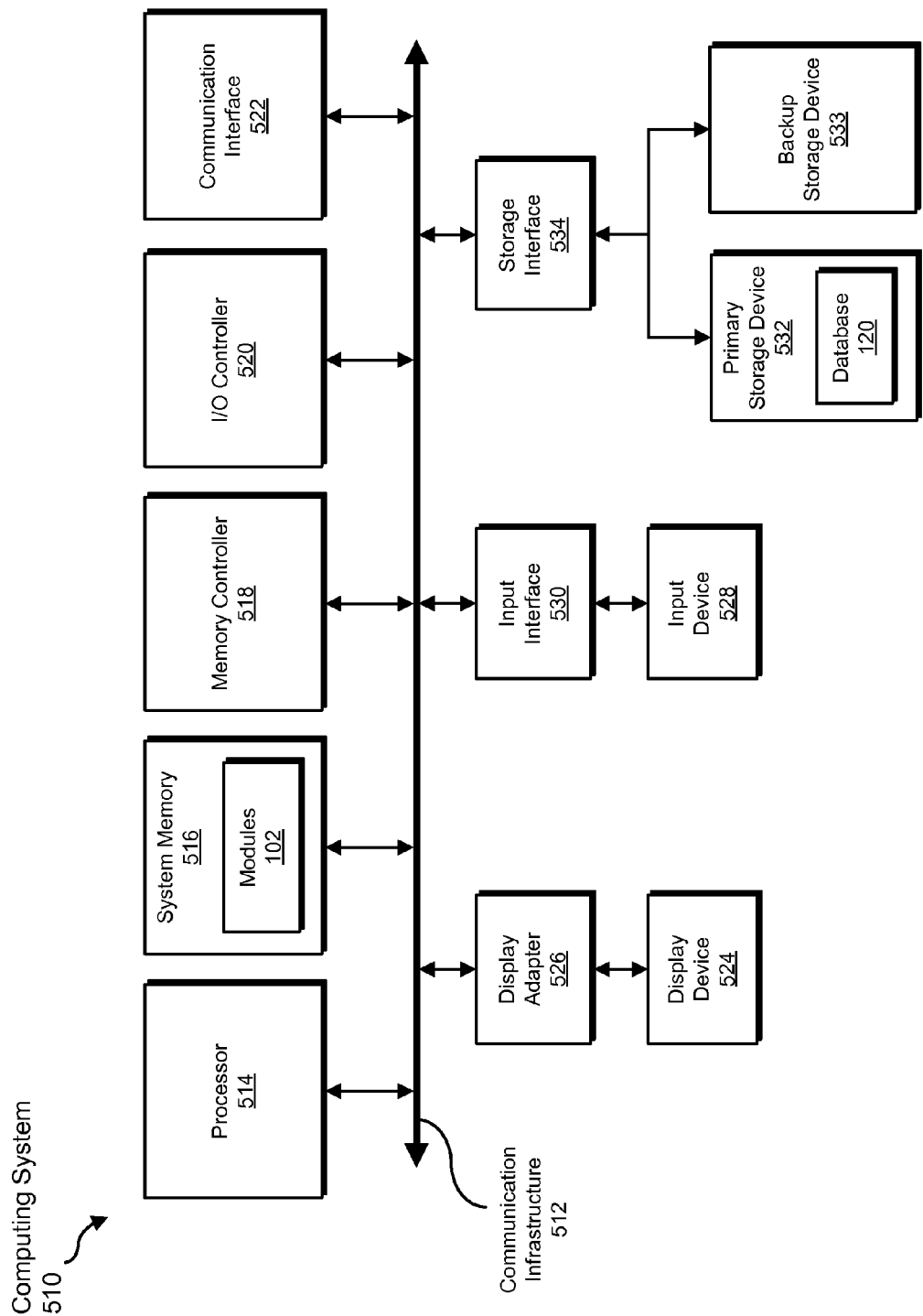
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
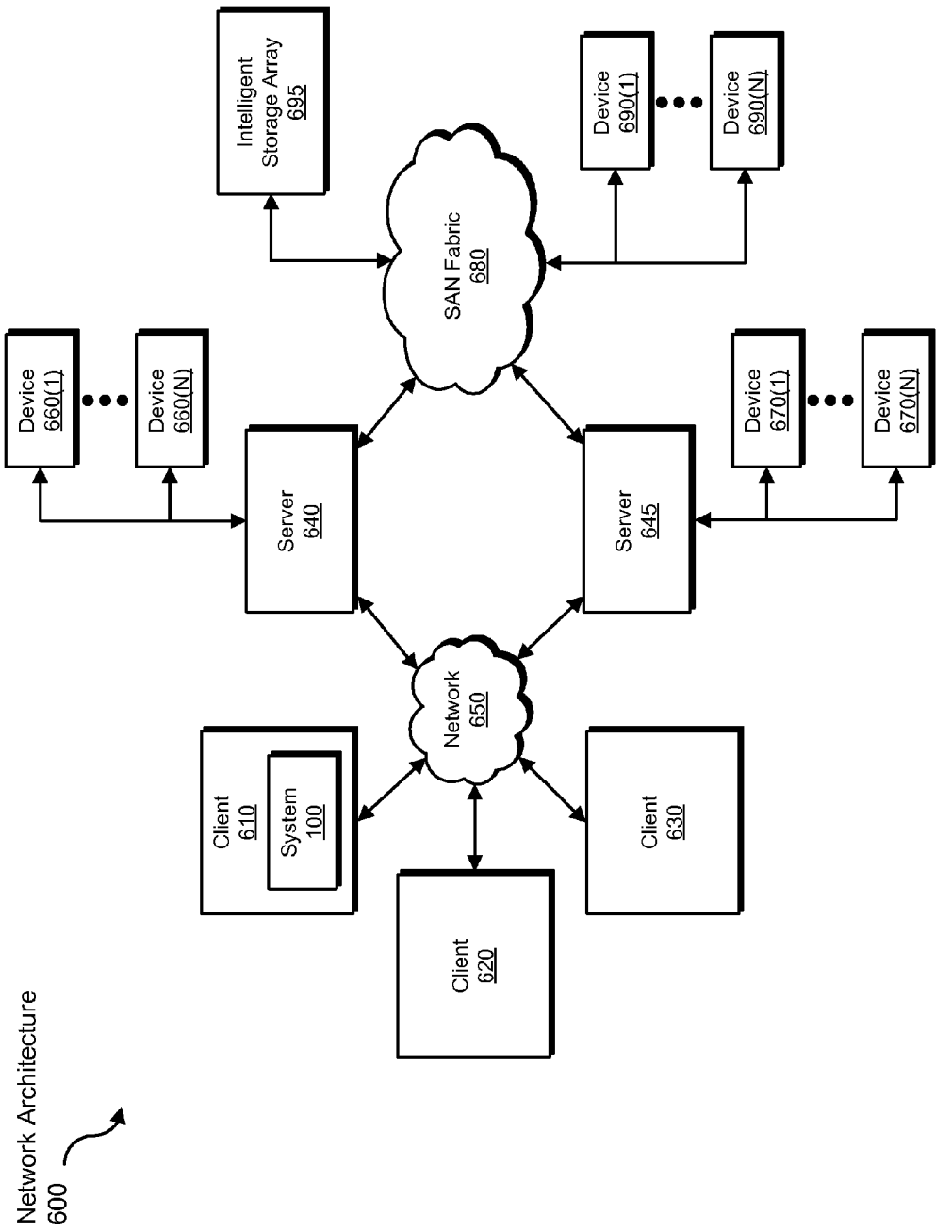
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for scanning packed programs in response to detecting suspicious behaviors.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a packed program that includes obfuscated malicious code to be transformed, transform the packed program into memory of the packed program that includes the malicious code in an unobfuscated state, output a result of the transformation to a system for detecting, analyzing, and/or classifying malware, use the result of the transformation to scan the memory of the packed program for one or more malware signatures, and store the result of the transformation to a storage system for storing information about malicious programs and/or code. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for scanning packed programs in response to detecting suspicious behaviors, at least a portion of the method being performed by a computing device comprising at least one processor, the method comprising:
   executing a packed program that comprises:
      malicious code that has been obfuscated within the packed program;
      unpacking code that deobfuscates and executes the malicious code when the packed program is executed;
   receiving scanning criteria that specifies at least one suspicious behavior that will trigger scanning of a portion of memory of the packed program for at least one malware signature that is associated with the at least one suspicious behavior, wherein the at least one suspicious behavior indicates that the unpacking code has deobfuscated and executed the malicious code;
   monitoring, while the packed program is executing, how the packed program behaves;
   detecting, while monitoring how the packed program behaves, the at least one suspicious behavior;
   scanning, in response to detecting the at least one suspicious behavior, the portion of the memory of the packed program for only the at least one malware signature that is associated with the at least one suspicious behavior;
   wherein the at least one malware signature that is associated with the at least one suspicious behavior comprises a subset of a set of malware signatures used to scan for malware such that scanning the portion of the memory of the packed program for only the at least one malware signature that is associated with the at least one suspicious behavior reduces a number of malware signatures used to scan the packed program for malware.

2. The method of claim 1, wherein scanning the portion of the memory of the packed program for only the at least one malware signature that is associated with the at least one suspicious behavior comprises scanning only the portion of the memory of the packed program for only the at least one malware signature that is associated with the at least one suspicious behavior.

3. The method of claim 2, wherein the portion of the memory of the packed program comprises less than all of the memory of the packed program such that scanning only the portion of the memory of the packed program for only the at least one malware signature that is associated with the at least one suspicious behavior reduces an amount of memory of the packed program that is scanned.

4. The method of claim 1 wherein:
the at least one suspicious behavior comprises a behavior of a known malicious program;
the at least one malware signature that is associated with the at least one suspicious behavior comprises a signature of the known malicious program.

5. The method of claim 1, wherein detecting the at least one suspicious behavior comprises detecting an attempt, by the malicious code, to create a run registry key.

6. The method of claim 1, wherein detecting the at least one suspicious behavior comprises detecting an attempt, by the malicious code, to create a generic load point.

7. The method of claim 1, wherein detecting the at least one suspicious behavior comprises detecting an attempt, by the malicious code, to inject the malicious code into a process.

8. The method of claim 1, wherein detecting the at least one suspicious behavior comprises detecting an attempt, by the malicious code, to modify security settings.

9. A system for scanning packed programs in response to detecting suspicious behaviors, the system comprising:
an executing module, stored in a memory, that executes a packed program that comprises:
  malicious code that has been obfuscated within the packed program;
  unpacking code that deobfuscates and executes the malicious code when the packed program is executed;
a receiving module, stored in the memory, that receives scanning criteria that specifies at least one suspicious behavior that will trigger scanning of a portion of memory of the packed program for at least one malware signature that is associated with the at least one suspicious behavior, wherein the at least one suspicious behavior indicates that the unpacking code has deobfuscated and executed the malicious code;
a monitoring module, stored in the memory, that monitors how the packed program behaves while the packed program is executing;
a detecting module, stored in the memory, that detects, while the packed program is monitored, the at least one suspicious behavior;
a security module, stored in the memory, that scans, in response to detecting the at least one suspicious behavior, the portion of the memory of the packed program for only the at least one malware signature that is associated with the at least one suspicious behavior;
at least one processor that executes the executing module, the monitoring module, the detecting module, and the security module;
wherein the at least one malware signature that is associated with the at least one suspicious behavior comprises a subset of a set of the malware signatures used to scan for malware such that the security module reduces a number of malware signatures used to scan the packed program for malware by scanning the portion of the memory of the packed program for only the at least one malware signature that is associated with the at least one suspicious behavior.

10. The system of claim 9, wherein the security module scans the portion of the memory of the packed program for only the at least one malware signature that is associated with the at least one suspicious behavior by scanning only the portion of the memory of the packed program for only the at least one malware signature that is associated with the at least one suspicious behavior.

11. The system of claim 10, wherein the portion of the memory of the packed program comprises less than all of the memory of the packed program such that the security module reduces an amount of memory of the packed program that is scanned by scanning only the portion of the memory of the packed program for only the at least one malware signature that is associated with the at least one suspicious behavior.

12. The system of claim 9 wherein:
the at least one suspicious behavior comprises a behavior of a known malicious program;
the at least one malware signature that is associated with the at least one suspicious behavior comprises a signature of the known malicious program.

13. The system of claim 9, wherein the detecting module detects the at least one suspicious behavior by detecting an attempt, by the malicious code, to create a run registry key.

14. The system of claim 9, wherein the detecting module detects the at least one suspicious behavior by detecting an attempt, by the malicious code, to create a generic load point.

15. The system of claim 9, wherein the detecting module detects the at least one suspicious behavior by detecting an attempt, by the malicious code, to inject the malicious code into a process.

16. The system of claim 9, wherein the detecting module detects the at least one suspicious behavior by detecting an attempt, by the malicious code, to modify security settings.

17. A non-transitory computer-readable medium comprising one or more computer-executable instructions that, when executed by at least one processor of a computing device, cause the computing device to:
execute a packed program that comprises:
  malicious code that has been obfuscated within the packed program;
  unpacking code that deobfuscates and executes the malicious code when the packed program is executed;
receive scanning criteria that specifies at least one suspicious behavior that will trigger scanning of a portion of memory of the packed program for at least one malware signature that is associated with the at least one suspicious behavior, wherein the at least one suspicious behavior indicates that the unpacking code has deobfuscated and executed the malicious code;
monitor, while the packed program is executing, how the packed program behaves;
detect, while monitoring how the packed program behaves, the at least one suspicious behavior;
scan, in response to detecting the at least one suspicious behavior, the portion of the memory of the packed program for only the at least one malware signature that is associated with the at least one suspicious behavior;
wherein the at least one malware signature that is associated with the at least one suspicious behavior comprises a subset of a set of malware signatures used to scan for malware such that scanning the portion of the memory of the packed program for only the at least one malware signature that is associated with the at least one suspicious behavior reduces a number of malware signatures used to scan the packed program for malware.

18. The non-transitory computer-readable medium of claim 17, wherein the one or more computer-executable instructions cause the computing device to scan the portion of the memory of the packed program for only the at least one malware signature that is associated with the at least one suspicious behavior by causing the computing device to scan only the portion of the memory of the packed program for only the at least one malware signature that is associated with the at least one suspicious behavior.

\* \* \* \* \*